United States Patent Office 3,449,503
Patented June 10, 1969

3,449,503
COMPOSITIONS FOR THE RELIEF OF NEPHRITIC COLICS, HEPATIC DISTURBANCES AND DISORDERS OF THE GALL BLADDER, CONTAINING TRIMETHOXYBENZENE AND TRIMETHOXYACETOPHENONE
Louis Lafon, Paris, France, assignor, by mesne assignments, to Société anonyme dite: Orsymonde, Paris, France
No Drawing. Continuation of application Ser. No. 418,537, Dec. 15, 1964, and division of application Ser. No. 186,313, Apr. 10, 1962. This application July 17, 1967, Ser. No. 654,005
Int. Cl. A61k 27/00
U.S. Cl. 424—331          7 Claims

ABSTRACT OF THE DISCLOSURE

Compositions comprising trimethoxybenzene or trimethoxyacetophenone to be administered either in the form of tablets orally or intravenously in the form of ampoules, or rectally in the form of suppositories, are suitable for the relief of pain due to nephritic colics, hepatic disturbances, and disorders of the gall bladder.

---

This application is a division of my copending application Ser. No. 186,313, filed Apr. 10, 1962, now abandoned and a continuation of U.S. Ser. No. 418,537, filed Dec. 15, 1964, now abandoned, and relates to pharmaceutical compositions for the treatment of certain digestive disorders wherein the essential active ingredient is either trimethoxybenzene or trimethoxyacetophenone and to the administration of such pharmaceutical compositions to treat such digestive disorders of hepatobiliary origin, and nephritic colic. The active ingredient is administered in a therapeutically effective amount of 0.05 to 0.20 grams combined with a suitable carrier or excipient and may be in any of the usual dosage forms such as coated tablets.

Trimethoxybenzene corresponding to the formula:

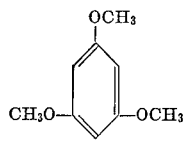

is obtained by treating phloroglucinol first with methanol and hydrochloric acid, in order to obtain dimethylphloroglucinol, and then with dimethyl sulphate and sodium hydroxide, in order to methylate the last hydroxyl group.

The preparation of this product is carried out as follows:

Commercial phloroglucinol, which crystallizes with 2 molecules of water in an oven at 100°–120° C., was dried to constant weight.

200 g. of the thus-dried phloroglucinol were introduced into a 4-litre flask with 2,000 ccs. of pure methanol and a stream of dry hydrogen chloride was passed in while externally cooling so that the temperature remained below 30° C., until the liquid was saturated with hydrochloric acid. The flask was allowed to stand for 10 hours and the excess methanol was then eliminated by evaporation under partial vacuum.

A thick yellow-orange syrup was obtained constituted of dimethylphloroglucinol containing some monomethylphloroglucinol.

The product was introduced into a 5-litre flask provided with an agitator device and a thermometer and 800 ccs. of dimethyl sulphate were added. When the mixture had become homogeneous, 2,400 ccs. of 7.5 N caustic soda were added in separate portions by means of a bromine ampoule. The temperature rose to about 80° C. and the liquid became reddish-orange.

After the addition, which lasted for about 2 hours, the mixture was heated to 90° C. for 30 minutes and then allowed to cool.

After complete cooling, the liquid was extracted three times with ether. A total of 2,500 ccs. of ether were used. The ether was evaporated and a crystalline residue was obtained constituted of crude trimethoxybenzene, which was purified by recrystallization from methanol.

In order to obtain a purer product, the residue can be distilled under vacuum and colorless trimethoxybenzene melting at 51° C. is thus obtained, the yield then being 65%.

A certain number of pharmacodynamic tests on trimethoxybenzene hav been carried out. The acute toxicity has been studied in the mouse. By intraperitoneal administration, tests carried out on 24 mice of the Webster strain, having weights ranging from 16 to 25 g., have shown that a dose of only 2 g./kg. leads to a mortality of only ¼ of the animals.

By intravenous administration, tests carried out on 36 mice have shown that a dose of 20 mg./kg. causes death of ⅙ of the animals.

By gastric administration, even a dose of 3 g./kg. causes no mortality in 36 mice tested.

The musculotropic antispasmodic effect of trimethoxybenzene has been studied on rat duodenum maintained alive by immersion in oxygenated Tyrode liquid (the water-bath temperature being 32° C.) and subjected to the spasmogenic effect of barium chloride. It was observed that 33γ of trimethoxybenzene exerts the same muscular relaxing effect as 1.45γ of papaverine.

The neurotropic antispasmodic effect has also been studied by utilizing acetylcholine as the spasmogenic agent. On 7 rat duodena, trimethoxybenzene, in a dose of 26.75γ, proves to be equally as active as 0.10γ of atropine.

On guinea-pig ureter maintained alive in special Locke liquid at 37° C. and deprived of magnesium phosphate salts, the amplitude of the pendular and rhythmic movements of the ureter have been accelerated and increased by the addition of barium chloride to the bath. 1 mg. of trimethoxybenzene exerts the same effect as 0.03 mg. of papaverine.

The effect upon the coronary output has also been studied by the Langendorff method by perfusion of isolated rabbit hearts, the temperature of the experiment being 35° C. The tests were carried out on four organs and have shown that the vasodilatory action of trimethoxybenzene is ten times less than that of papaverine.

The effect of the compound in situ has also been studied. The cardiovascular effect has also been examined by the method of recording the carotid pressure by means of a Ludwig manometer on 7 dogs anesthetized and chloralose and, in doses of 2 to 10 mg./kg. no modification of the carotid pressure has been observed. A dose of 20 mg./kg. diminishes the carotid pressure by 50% in a temporary manner.

The antispasmodic action in situ of trimethoxybenzene has been studied on the Oddi sphincter in the dog.

The method of Butsch, Walters and McGowan using biliary manometry has been used. After cholecystectomy, the variation in the pressure in the extra-hepatic ducts has been recorded by means of a water manometer, the spasm being caused by injection of barium chloride and the transit pressure and the residual pressure being measured. In a dose of 5 mg./kg., a very slight diminution of the transit pressure and the residual pressure were observed.

Finally, the action of trimethoxybenzene has also been examined on choleresis:

on the one hand, in the dog with acute biliary fistula;
on the other hand, in the dog with chronic biliary fistula.

In the case of acute fistula, after ligature of the cystic duct, the choledoch duct was catheterized by means of a polyethylene tube and the bile was recovered and the amount measured. The dog was anesthetized with chloralose and the results were not taken until after a period of 2 hours, namely the time necessary for disappearance of the choleretic effect of the chloralose. The biliary output was then measured by an electric drop-counter.

On 5 dogs, it was observed that a dose of 2 mg./kg. temporarily diminished choleresis by 40–100% for between 3 and 15 minutes. A dose of 5 mg./kg. diminished the choleresis by about 70–80% for a period of 10 to 15 minutes and a dose of 10 mg./kg. exerted a still more intense effect over a period greater than 15 minutes.

In the case of chronic fistula, the Boucard method was used. The choledoch duct was sectioned and the vesicle was catheterized which, after several weeks, merely acts as reservoir. After three weeks, when the dog was restored and had become accustomed to consuming its bile added to its food, it could be tested.

After determination of the basal biliary output, the bile was recovered every 15 minutes and the samples were then analyzed.

It was thus seen that doses of 2 to 10 mg./kg. administered intravenously diminished choleresis in 4 dogs for 60 minutes in a proportion of 20 to 50%.

Trimethoxyacetophenone corresponding to the formula:

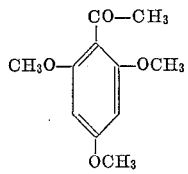

has also been studied.

This compound has been prepared by the action of acetonitrile on trimethoxyphloroglucinol acetyl perchlorate as a catalyst.

In one example, 6 mg. of trimethoxyphloroglucinol and 1.6 g. of acetonitrile were used. They were dissolved in 40 g. of dry ether and well dried hydrogen chloride was passed into the solution for 3 to 4 hours. The mixture was cooled in the freezer for 10 hours and a second stream of dry hydrogen chloride was passed through. The mixture was allowed to stand for 3 to 4 days in the freezer. The supernatant ether was decanted and the crystals formed were formed with anhydrous ether in order to eliminate the unreacted starting materials. The hydrochloric acid was taken up in 140 ccs. of water and the solution was heated on a water-bath for half an hour.

Trimethoxyacetophenone forms as a heavy oil which in the cold becomes a brown mass. This mass was purified by dissolving in the hot in alcohol at 50° C. and the ketone was reprecipitated in the cold. After 4 or 5 recrystallization, a pinkish-white product melting at 99°–100° C. was obtained, soluble in ether and alcohol and insoluble in water.

This compound has an antispasmodic action which is shown on isolated rat duodena maintained alive and contracted by means of barium chloride.

The musculotropic antispasmodic effect of trimethoxyacetophenone was thus observed to be 20 to 30 times less than that of papaverine.

Althaough trimethoxybenzene and trimethoxyacetophenone are known chemical compounds, it has not heretofore been discovered that they are useful and valuable in the treatment of digestive disorders nor that they can be orally ingested in an amount of about 0.05 to 0.20 gram for combating digestive disorders of hepatobiliary origin, and nephritic colic. The compounds have been clinically tested on about 40 patients suffering from the above digestive disorders with excellent results.

The invention is further illustrated by the following non-limitative examples:

EXAMPLE I

| | |
|---|---|
| Trimethoxybenezene _____gram__ | 0.10 |
| Glucose for one cachet or one capsule _____do____ | 0.10 |
| Phloroglucinol _____do____ | 0.02 |
| Trimethoxybenzene _____gamma__ | 20 |
| Glucose _____gram__ | 0.08 |
| Bidistilled water q.s. for one injectable ampulla _____ml__ | 2 |

EXAMPLE II

| | G. |
|---|---|
| Trimethoxybenzene _____ | 0.05–0.10 |
| Cocoa butter for one suppository _____ | 1.25–3 |

EXAMPLE III

| | G. |
|---|---|
| Trimethoxybenzene _____ | 0.16 |
| Lactose _____ | 0.04 |
| Glucose _____ | 0.04 |
| Sugar _____ | 0.03 |
| Magnesium stearate _____ | 0.003 |
| Talcum for one tablet _____ | 0.002 |

EXAMPLE IV

| | G. |
|---|---|
| Trimethoxyacetophenone _____ | 0.25 |
| Glucose _____ | 0.10 |
| Cocoa butter for one suppository _____ | 1.25 |

I claim:
1. A composition suitable for oral administration in capsule or cachet form comprising 0.10 g. of 1,3,5-trimethoxybenzene per unit dose and glucose.

2. A composition in tablet form suitable for oral administration comprising 0.16 g. of 1,3,5-trimethoxybenzene per unit dose, lactose, glucose, sugar, talc and magnesium stearate.

3. A composition suitable for rectal administration comprising between 0.05 and 0.1 g. of 1,3,5-trimethoxybenzene per unit dose and cocoa butter.

4. A composition suitable for intravenous injection consisting of an aqueous solution of 0.02 milligram per unit dose of 1,3,5-trimethoxybenzene, phloroglucinol and glucose.

5. A composition suitable for rectal administration comprising 0.25 g. of 2,4,6-trimethoxyacetophenone per unit dose, glucose and cocoa butter.

6. The method of treatment of a patient for relief of pains due to digestive disorders of hepatobiliary origin due to choleresis, which comprises administering to said patient a compound which is a member selected from the group consisting of 1,3,5-trimethoxybenzene and 2,4,6-trimethoxyacetophenone in the amount of between 0.05 g. and 0.2 g.

7. The method of treatment of a patient for relief of pains due to nephritic colics, which comprises administering to said patient a compound which is a member selected from the group consisting of 1,3,5-trimethoxybenzene and 2,4,6-trimethoxyacetophenone in the amount of between 0.05 g. and 0.2 g.

References Cited

Chem. Abst. subject index, 1957–1961 pp. 221S and 1461S.

FRANK CACCIAPAGLIA, JR., Primary Examiner.

U.S. Cl. X.R.

424—341, 346